US012625967B2

(12) United States Patent
Asbe et al.

(10) Patent No.: US 12,625,967 B2
(45) Date of Patent: May 12, 2026

(54) MULTISTAGE DEVICE BOOT WITH INDEPENDENT STAGE KEYS WHERE FIRST AUTHENTICATION TAG IS GENERATED DURING PREVIOUS BOOT OPERATION

(71) Applicant: QUALCOMM Incorporated, San Diego, CA (US)

(72) Inventors: Samar Asbe, San Diego, CA (US); Aseem Brahma, San Diego, CA (US); Shivaprasad Hongal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 18/447,888

(22) Filed: Aug. 10, 2023

(65) Prior Publication Data

US 2025/0053659 A1      Feb. 13, 2025

(51) Int. Cl.
| | |
|---|---|
| *G06F 9/00* | (2018.01) |
| *G06F 9/4401* | (2018.01) |
| *G06F 21/44* | (2013.01) |
| *G06F 21/57* | (2013.01) |
| *H04L 9/30* | (2006.01) |

(52) U.S. Cl.
CPC .......... *G06F 21/575* (2013.01); *G06F 9/4401* (2013.01); *G06F 21/44* (2013.01); *H04L 9/30* (2013.01); *G06F 2221/034* (2013.01)

(58) Field of Classification Search
CPC .......... G06F 9/4401; G06F 21/44; G06F 9/00; H04L 9/30
See application file for complete search history.

(56) References Cited

U.S. PATENT DOCUMENTS

| | | | | |
|---|---|---|---|---|
| 11,232,210 B2 * | 1/2022 | Lin | ........................ | G06F 21/575 |
| 11,610,025 B2 * | 3/2023 | Pelissier | ............... | H04L 9/0866 |
| 11,671,253 B2 * | 6/2023 | Tang | ................... | H04W 12/047 |
| | | | | 713/168 |
| 11,804,960 B2 * | 10/2023 | Mukherjee | ............ | H04L 9/0869 |
| 2022/0284104 A1 | 9/2022 | Herberholz et al. | | |
| 2024/0193246 A1 * | 6/2024 | Bansal | .................... | G06F 21/36 |

FOREIGN PATENT DOCUMENTS

| | | |
|---|---|---|
| DE | 112019005701 T5 | 7/2021 |
| GB | 2588648 A | 5/2021 |

OTHER PUBLICATIONS

International Search Report and Written Opinion—PCT/US2024/040635—ISA/EPO—Oct. 11, 2024.

* cited by examiner

*Primary Examiner* — Tammara R Peyton
(74) *Attorney, Agent, or Firm* — Polsinelli LLP

(57) ABSTRACT

Disclosed are systems, apparatuses, methods, and computer-readable media for booting a device with independent stage keys. In one illustrative example, a computing device can generate a first stage key for a first stage of a current boot operation of the device based on a private key associated with the device. The computing device can authenticate a first firmware of the first stage using a first authentication tag and the first stage key, wherein the first authentication tag is generated during a previous boot operation. computing device can execute the first firmware based on authenticating the first firmware.

24 Claims, 9 Drawing Sheets

800 →

300

400

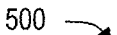
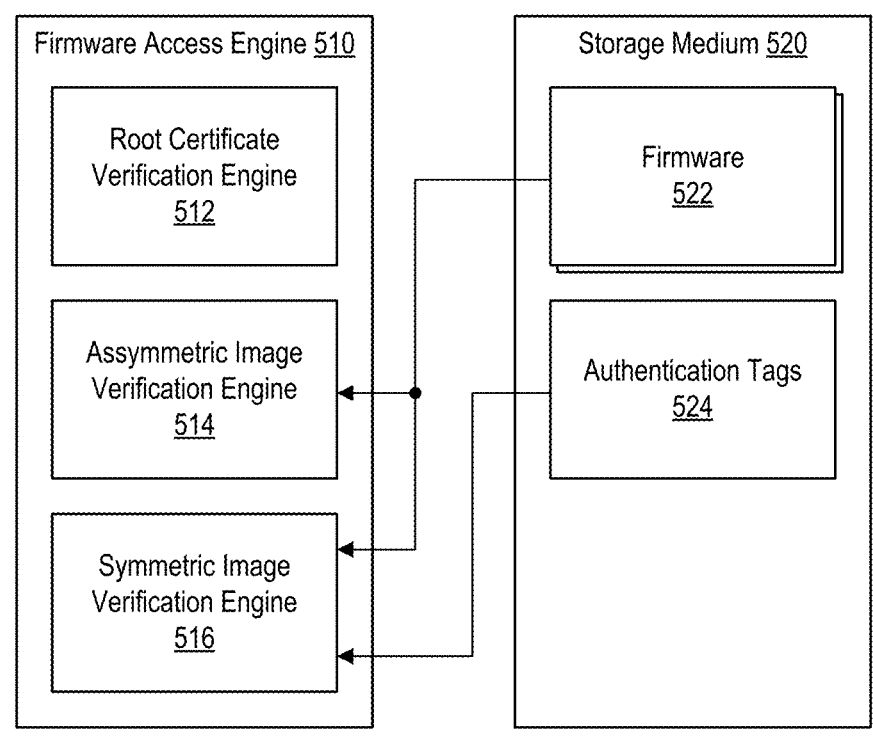
FIG. 5

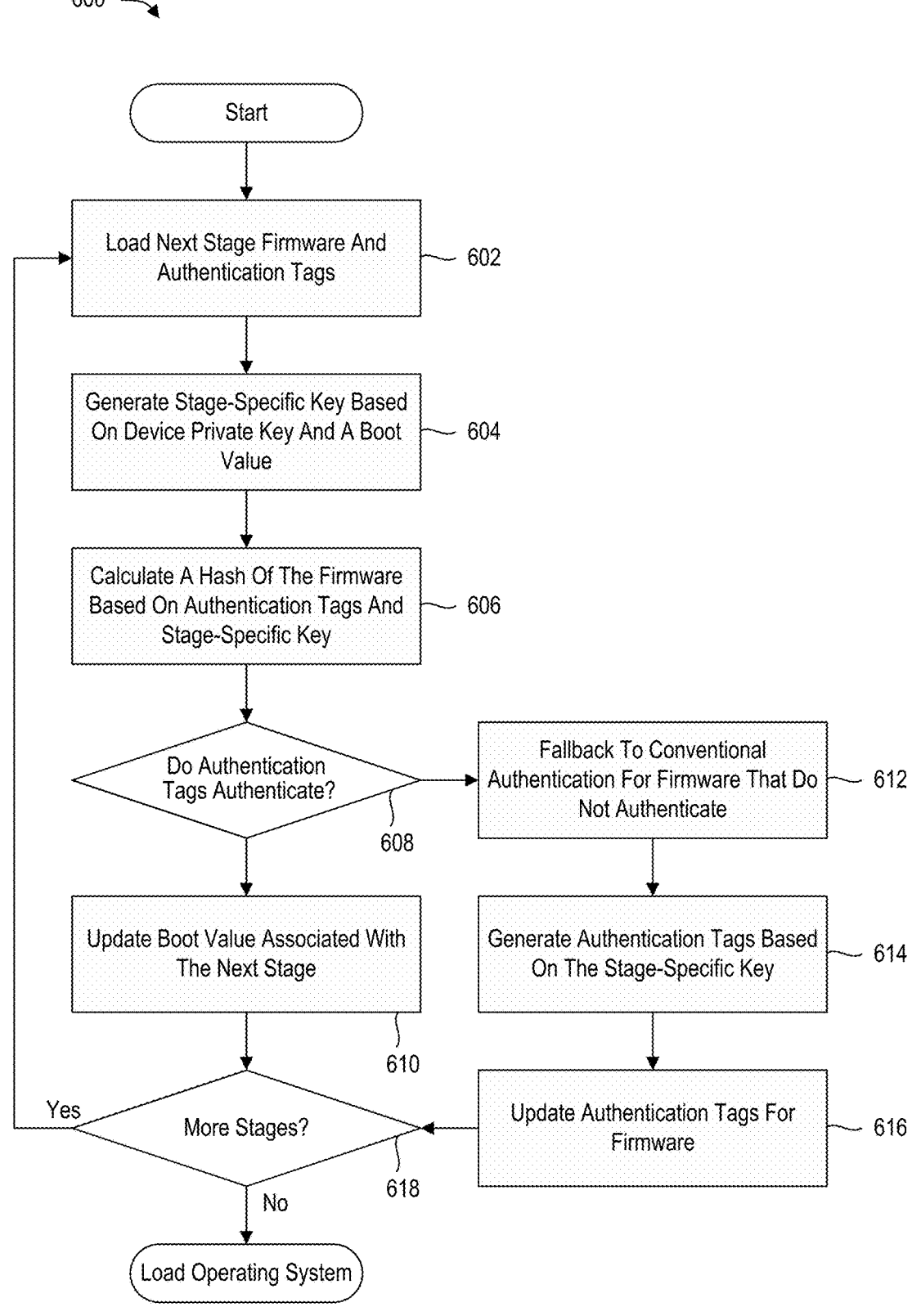

600

Start

Load Next Stage Firmware And Authentication Tags — 602

Generate Stage-Specific Key Based On Device Private Key And A Boot Value — 604

Calculate A Hash Of The Firmware Based On Authentication Tags And Stage-Specific Key — 606

Do Authentication Tags Authenticate? 608

Fallback To Conventional Authentication For Firmware That Do Not Authenticate — 612

Update Boot Value Associated With The Next Stage 610

Generate Authentication Tags Based On The Stage-Specific Key — 614

Update Authentication Tags For Firmware — 616

Yes    More Stages? 618

No

Update Authentication Tags For Firmware

Load Operating System

FIG. 6

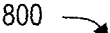

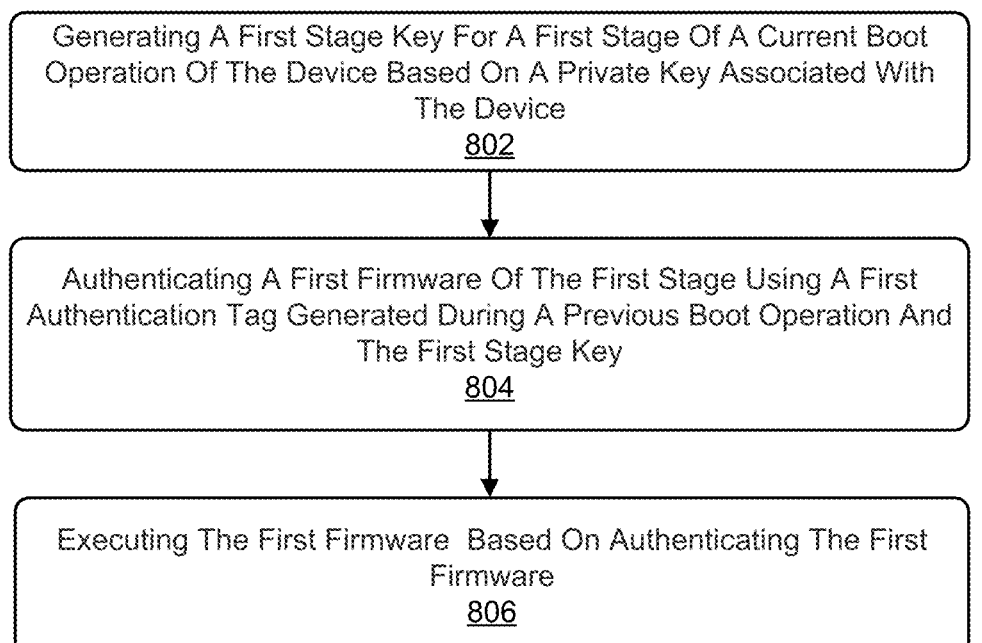

Generating A First Stage Key For A First Stage Of A Current Boot Operation Of The Device Based On A Private Key Associated With The Device
802

Authenticating A First Firmware Of The First Stage Using A First Authentication Tag Generated During A Previous Boot Operation And The First Stage Key
804

Executing The First Firmware Based On Authenticating The First Firmware
806

FIG. 8

MULTISTAGE DEVICE BOOT WITH INDEPENDENT STAGE KEYS WHERE FIRST AUTHENTICATION TAG IS GENERATED DURING PREVIOUS BOOT OPERATION

TECHNICAL FIELD

The disclosure relates generally to electronic devices and, more specifically, but not exclusively, to systems and techniques for multistage boot with independent stage keys.

BACKGROUND

Computing devices, such as mobile phones, tablets, and laptop computers, include many different components that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

An SoC generally includes multiple central processing unit (CPU) cores embedded in an integrated circuit or chip and coupled to a local bus. The CPU cores may further be arranged into or more computing clusters. The SoC may generally include hardware components and other processors. For example, an SoC may include one or more CPUs, CPUs with multiple cores, one or more digital signal processors, etc., grouped into one or more subsystems. An SoC can also include other components, such as a network interface, a programmable network processor, and other embedded components.

The SoC and other CPUs rely on a boot sequence or a boot code upon powering up. The boot sequence is the initial set of operations that the SoC performs when power is first applied to the SoC. The boot code enables a process (e.g., bootstrapping) that initializes and boots the SoC to load and execute an operating system (OS). The boot code is typically stored in a read-only memory (ROM) for quick access, low complexity, spatial efficiency, low cost, and security reasons.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described herein for providing multistage boot with independent stage keys. In one illustrative example, an apparatus configured for multistage boot is provided. The apparatus includes at least one memory and at least one processor coupled to the at least one memory. The at least one processor is configured to: generate a first stage key for a first stage of a current boot operation of the device based on a private key associated with the device; authenticate a first firmware of the first stage using a first authentication tag and the first stage key, wherein the first authentication tag is generated during a previous boot operation; and execute the first firmware based on authenticating the first firmware.

In another example, a method of booting a device is provided. The method includes: generating a first stage key for a first stage of a current boot operation of the device based on a private key associated with the device; authenticating a first firmware of the first stage using a first authentication tag and the first stage key, wherein the first authentication tag is generated during a previous boot operation; and executing the first firmware based on authenticating the first firmware.

In another example, a non-transitory computer-readable medium is provided that has stored thereon instructions that, when executed by one or more processors, cause the one or more processors to: generate a first stage key for a first stage of a current boot operation of the device based on a private key associated with the device; authenticate a first firmware of the first stage using a first authentication tag and the first stage key, wherein the first authentication tag is generated during a previous boot operation; and execute the first firmware based on authenticating the first firmware.

In another example, an apparatus for booting using at least one firmware is provided. The apparatus includes: means for generating a first stage key for a first stage of a current boot operation of the device based on a private key associated with the device; means for authenticating a first firmware of the first stage using a first authentication tag and the first stage key, wherein the first authentication tag is generated during a previous boot operation; and means for executing the first firmware based on authenticating the first firmware.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 5 is a block diagram of a multistage boot with independent stage keys in accordance with some aspects of the disclosure;

FIG. 6 illustrates a method of a firmware authentication engine for authenticating a plurality of boot software binaries with independent stage keys in accordance with some aspects of the disclosure;

FIG. 8 illustrates a method of booting a device using multiple stages with independent stage keys in accordance with some aspects of the disclosure.

DETAILED DESCRIPTION

Figure 1:
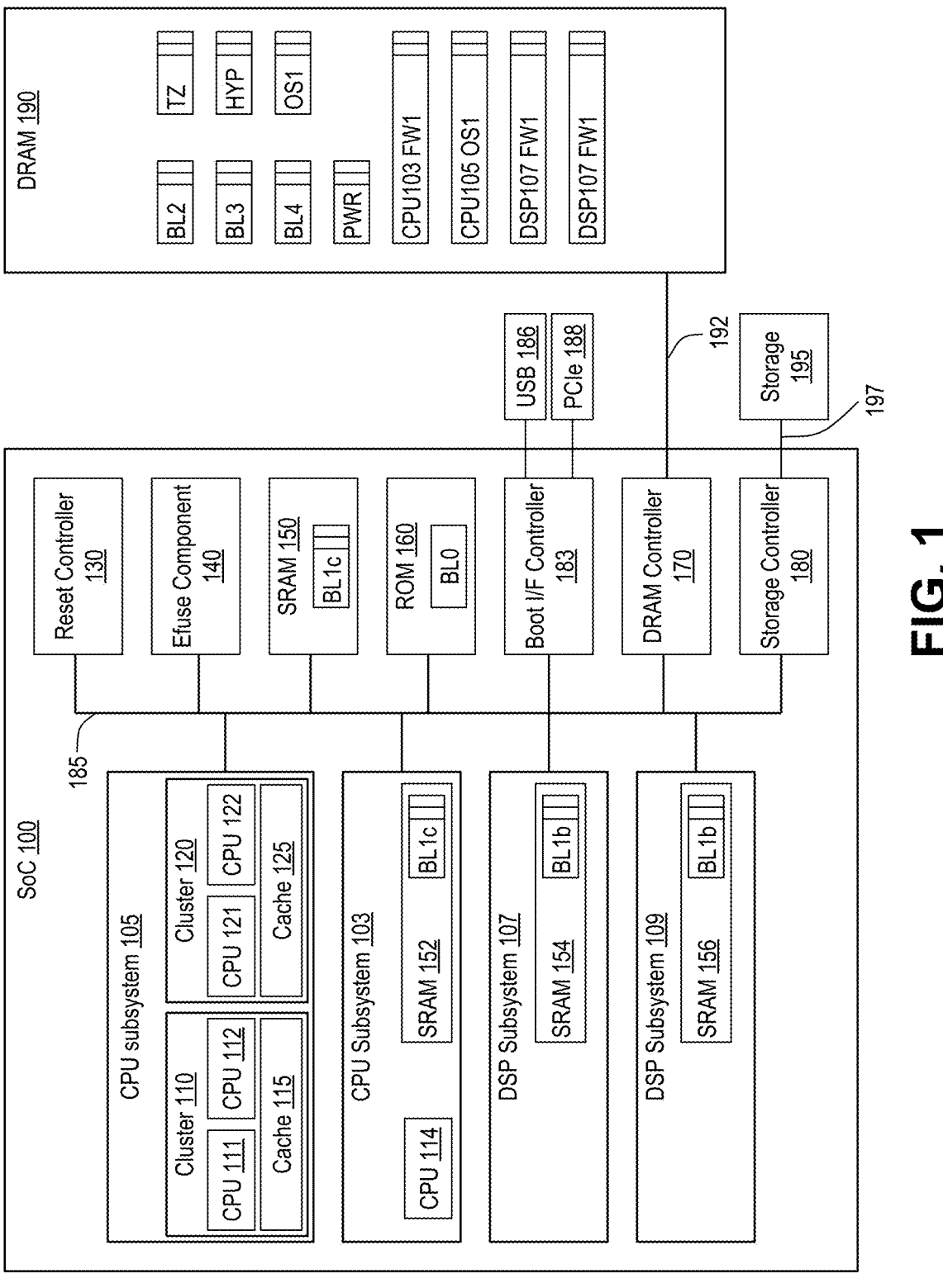
FIG. 1 is a simplified schematic diagram of a system-on-chip (SoC) in accordance with certain aspects of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

System-on-chip (SoC) devices and modem processors (e.g., central processing units (CPUs), digital signal processors (DSPs), graphics processors, etc.) rely on a boot sequence or a boot code upon powering up. For example, when performing a boot sequence, a system (e.g., an SoC) may utilize internal memory (e.g., on-chip memory that is on the same chip as the SoC, such as static random-access memory (SRAM)) and complex drivers to securely boot the system. In some cases, when performing the boot sequence, the system (e.g., the SoC) may also utilize external memory (e.g., off-chip memory that is off the same chip as the SoC, including dynamic random access memory (DRAM), such as double data rate (DDR) synchronous DRAM (SDRAM), low power DDR (LPDDR), etc.), such as to save costs on the amount of internal memory used when the system (e.g., SoC) has more functionality that requires more memory to boot. The external memory may be stacked with the SoC (e.g., application processor, modem chip, etc.), may be configured as a package-on-package design, may be completely external (e.g., not on the same package as the SoC), etc.

As part of the boot sequence, to boot each of or group of the hardware components and other processors of the system (e.g., SoC), there may be a chain of bootloaders and handoff secure executables (e.g., firmware, etc., also referred to as firmware images). Firmware is software that provides basic machine instructions for hardware, which allows the hardware to function and communicate with other software running on a device or other components that interact with the device. The firmware may also perform initial powerup functions, such as perform a self-test, initialize a state of the device, and so forth. The firmware should be secured within the system to prevent malicious actors from tampering with the firmware. Each of the hardware components of the system (e.g., SoC) may need to be booted (e.g., securely booted) using a firmware image (e.g., a respective firmware image for each hardware component). A chain loading method may be used to boot the various hardware components of the system (e.g., SoC) by executing each of the firmware images. The greater the number of hardware components on the system (e.g., SoC), the greater the number of firmware images for the system that need to be executed. Accordingly, the boot time of the system (e.g., for secure and non-secure boot of components of an SoC) is a function of the number of firmware images.

In addition, the boot of one or more of the hardware components may be secured, such as to meet requirements in certain applications for strong integrity checks, authentication, or other security algorithms, to ensure that the firmware images have not been tampered with or corrupted and originate from the intended party. Accordingly, the system (e.g., SoC) may implement hashing algorithms (e.g., SHA256, SHA384, SHA512, etc.), encryption algorithms (e.g., AES variants), and/or digital signature algorithms (e.g., RSA 2K, RSA 4K, ECC P384, etc.) for checking the integrity and authentication of the firmware images. When secure boot is not enabled, hashing algorithms may still be used to enforce integrity check of firmware images, such as when booting from flash media or a flashless interface or interconnect (e.g., a universal serial bus (USB), peripheral component interconnect express (PCIe), etc.). These various algorithms may be implemented in hardware or in software on the system (e.g., SoC) and due to computational complexity, may result in increased boot time of the system. The greater the number of firmware images, the more times such algorithms are run on the firmware images, thus increasing boot time.

Each firmware image may need to have multiple asymmetric cryptographic calculations performed to validate the authenticity of the firmware image. A root certificate of the system itself is authenticated, and the root certificate is used to authenticate a leaf certificate that signs a firmware, and the leaf certificate then has to validate a signature. Asymmetric cryptographic calculations are more expensive because of their complexity as well as the length of the key. For example, the National Institute of Standards and Technology (NIST) recommends a 128-bit length key for symmetric cryptographic keys and 2048 bits for asymmetric cryptographic keys. In current hardware devices, a single asymmetric cryptographic calculation consumes a large amount of time (e.g., 10 ms of time), and multiple calculations and further additional firmware can significantly increase the time associated with the boot operation. A boot operation is a process of booting (or starting) a device when the device is powered on or reset (e.g., the start of power up) to a milestone defined for a particular product that indicates an end of the boot operation. Boot milestones may vary based on a particular use case of the device. For example, in the case of a device with a user interface, the boot operation may begin from a power on reset and may end when a user interface is loaded and available for the user to operate the device.

Systems, apparatuses, processes (also referred to as methods), and computer-readable media (collectively referred to as "systems and techniques") are described herein for a multistage boot process with independent stage keys (referred to as stage-independent keys). In some cases, the stage keys can include authentication keys. For instance, according to some aspects, the multistage boot process can use the stage-independent keys to perform authentication of firmware images during a boot process of a system (e.g., an SoC, processor, etc.). In some cases, the multistage boot process may use authentication tags to authenticate a firmware image based on symmetric cryptographic functions. In some aspects, the symmetric cryptographic functions can be configured during a previous successful authentication using asymmetric cryptography. For example, after using a public key to authenticate a firmware image and the certificate chain, a keyed hash of the firmware image can be computed and stored in an authentication tag. The authentication tag may be a key-pair value table or another data structure that maps an image associated with a hardware device (e.g., a wireless communication device) or a hardware function (e.g., an external memory initialization function). During a subsequent boot, in place of authenticating the firmware image based on the certificate chain, the authentication tags can authenticate the firmware image. Symmetric cryptographic functions are faster and more efficient. In this case, the authentication tags enable faster and power efficient boot operations.

Various aspects of the present disclosure will be described with respect to the figures.

FIG. 1 is a block diagram of an SoC 100 in accordance with certain aspects of the present disclosure. The SoC 100 may be interconnected to other chips by one or more chip-to-chip interfaces such as PCIe, USB, serial peripheral interface (SPI), etc. In certain aspects, one of the one or more chip-to-chip interfaces may be used for booting the SoC 100.

As shown, the SoC 100 includes a CPU subsystem 105. The CPU subsystem 105 includes a plurality of CPU cores 111, 112, 121, and 122. Though CPU subsystem 105 is shown with a particular number of CPU cores, it should be noted that there may be additional or fewer cores in CPU subsystem 105. Further, CPU cores 111 and 112 are part of a cluster 110, and CPU cores 121 and 122 are part of a cluster 120. Again, though shown with a particular number of CPU clusters, CPU subsystem 105 may include additional or fewer clusters. Further, each cluster may include the same or a different number of CPU cores. The CPU cores of a given cluster (e.g., CPU cluster 110 or 120) may be of the same type, or may be of different types (e.g., in-cluster big.LITTLE design, cluster-based big.LITTLE design, etc.). A big.LITTLE design may refer to a computing architecture that includes low power, slower processor cores (e.g., LITTLE) that provide battery-savings along with high power, faster processor cores (e.g., big) that provide better processing performance.

Further, the CPU subsystem 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPU subsystem 105 may include additional or different CPU resources than those shown. For example, in some aspects, one or more CPU cores may have its own associated cache, one or more clusters may have its own associated cache (e.g., shared by CPU cores of the cluster), and/or the CPU subsystem 105 may include one or more caches shared by one or more clusters and/or CPU cores. The SoC 100 further may include additional CPU subsystem 103 and one or more digital signal processor (DSP) subsystems such as DSP subsystem 107 and DSP subsystem 109. In certain aspects, each of CPU subsystem 103, DSP subsystem 107, and DSP subsystem 109 may have its own SRAM 152, 154, and 156, respectively, functioning as (e.g., in lieu of) a cache for reading and writing data. CPU subsystem 103 is shown as having a single CPU core 114 but may include additional cores, caches, etc.

The SoC 100 further includes a reset controller 130, an e-fuse component 140, SRAM 150, a read only memory (ROM) 160, a DRAM controller 170, a storage controller 180, and boot interface (I/F) controller 183, which are all shown as internal (e.g., on-chip) components of the SoC 100. The internal components of the SoC 100 are coupled together by a bus 185. Further, the DRAM controller 170 is coupled to a DRAM 190, which is external (e.g., off-chip) to the SoC 100, by a bus 192. A physical implementation of the DRAM 190 may be stacked with the SoC 100, may be configured as a package-on-package design, may be completely external (e.g., not part of the same package as the SoC 100), etc. The storage controller 180 is coupled to a storage 195 (e.g., flash storage) external (e.g., off-chip) to the SoC 100 by a bus 197. The SRAM 150, DRAM 190, and storage 195 may provide storage capacity for the SoC 100 in addition to caches 115 and 125.

In some aspects, the reset controller 130, during system boot, is configured to release a CPU core of the CPU subsystem 105 from reset. In some aspects, the CPU core released is then configured to begin executing code/data (e.g., boot code), such as ROM bootloader BL0 as shown, from the ROM 160 to begin booting the SoC 100. The ROM 160 (e.g., boot ROM) is an integrated circuit that includes the code or codes (e.g., boot code) that are executed by the CPU subsystem 105 during an initial power-on or upon a watchdog reset condition (e.g., after a malfunction of SoC 100 that is detected by a timer on SoC 100 not being reset or "timing out"). In some aspects, the CPU subsystem 105 boots (e.g., securely) from storage 195 by running executables, data images, etc., stored in storage 195 for booting the SoC 100, including the various hardware components of the SoC 100. For example, the CPU subsystem 105 loads the firmware images into DRAM 190 from storage 195 for execution. In some aspects, the CPU subsystem 105 boots (e.g., securely) from a transport layer instead of a storage (e.g., a flashless transport layer). For example, the CPU subsystem 105 may boot from the transport layer by loading firmware images booting the SoC 100 received over the transport layer into DRAM 190 for execution. In particular, SoC 100 may utilize boot the boot I/F controller 183 to communicate with another component (e.g., another SoC) over a chip-to-chip interface. For example, boot I/F controller 183 of SoC 100 may control a chip-to-chip interface (e.g., transport layer) of SoC 100, such as PCIe 188 or USB 186, to communicate with a chip-to-chip interface of another component. Accordingly, SoC 100 may communicate over a transport layer via boot I/F controller 183.

In certain aspects, CPU subsystem 105 boots securely by checking the integrity of firmware images used for boot prior to execution of the firmware images (e.g., using a cryptographic signature protocol, a chain of trust, authentication tags, checksums, etc.).

In certain aspects, the CPU subsystem 105 is configured to boot by running firmware images shown as loaded in DRAM 190, SRAM 150, SRAM 152, SRAM 154, and SRAM 156. For example, the CPU subsystem 105 executes ROM bootloader BL0 from ROM 160. The ROM bootloader BL0 causes the CPU subsystem 105 to execute bootloader BL1*a* in SRAM 150. Bootloader BL1*a* may initialize a DRAM controller 170 and DRAM 190. In certain aspects (e.g., in a boot configuration from flash storage), bootloader BL1*a* also initializes storage controller 180 and storage 195 and causes CPU subsystem 105 to load the firmware images into DRAM 190 from storage 195 for execution. In certain aspects (e.g., in a flashless boot configuration), instead of initializing storage controller 180 and storage 195, bootloader BL1*a* also initializes the boot I/F controller 183 and causes CPU subsystem 105 to load the firmware received over the transport layer into DRAM 190 for execution. Accordingly, the SoC 100 can access firmware images from DRAM 190. BL1*a* may further boot the SoC 100 by controlling the execution of additional firmware images, such as bootloaders BL2, BL3, and BL4, TZ (e.g., secure world firmware), HYP (e.g., hypervisor firmware), and OS1 (e.g., operating system) on the application processor (e.g., CPU subsystem 105) subsystem. Further, in certain aspects, other subsystem firmware images booted during the boot process include PWR (e.g., power firmware), CPU subsystem 103 FW1 (e.g., CPU subsystem 103 firmware), CPU subsystem103 OS1 (e.g., CPU subsystem 103 operating system), DSP107 FW1 (e.g., DSP subsystem 107 firmware), and DSP109 FW1 (e.g., DSP subsystem 109 firmware). In certain aspects, BL1*a* may further boot the SoC 100 by controlling the execution of additional firmware images by other subsystems, such as BL1b by DSP subsystem 107 and BL1c by CPU subsystem 103. In certain aspects, certain early firmware images are booted by BL1*a*, and the remaining firmware images are booted by an operating system such as OS1.

Conventionally, the execution of each of BL0, BL1*a*, BL2, BL3, and BL4 is performed on a single core (e.g., CPU core 111) of CPU subsystem 105, and each is run as a single thread and an operating system, such as the kernel of OS1, is the first firmware image executed on the SoC 100 that enables a scheduler to enable multi-thread and multi-core optimizations to allow multiple CPU cores of CPU subsystem 105 to execute additional firmware images during boot and/or allow processes to be executed as separate threads that run on one or more CPU cores of CPU subsystem 105. For example, BL2 and BL3 may implement and enable a pre-boot environment (e.g., as defined by the Unified Extensible Firmware Interface (UEFI) specification), and BL4 may be a boot manager that loads the OS.

The UEFI is a specification that describes a software interface between an OS and the hardware platform or system (e.g., SoC) that the OS executes on. For example, UEFI differentiates between a pre-boot environment, which is before an OS is executing on the SoC, and a post-boot environment, where the OS is executing on the SoC. The distinction between boot environments allows an OS to be designed in a hardware-agnostic manner, and a software interface may create an interface between the OS and the SoC. In some aspects, a platform initialization (PI) specification may define a pre-boot environment, for example, before the boot process is complete and the OS is fully running. The PI specification includes the chain of boot phases for an SoC (e.g., a Security (SEC) phase, a pre-EFI initialization phase (PEI), a driver execution Environment (DXE) Phase, a boot device selection (BDS) Phase, an OS loader phase, etc.).

The pre-boot environment may be configured by loading and executing at the SoC a firmware or firmware image that enables the pre-boot environment. The pre-boot environment may provide certain drivers, frameworks, protocols, and interfaces and may allow certain applications to run on the SoC in the pre-boot environment. For example, a boot manager application (e.g., OS loader) may be executed in the pre-boot environment that loads the OS. Other applications may also be run in the pre-boot environment, such as applications that test and verify the functionality of CPU cores, memory, applications that program (e.g., at the factory) firmware images to the SoC (e.g., via fastboot), etc.

Figure 2:
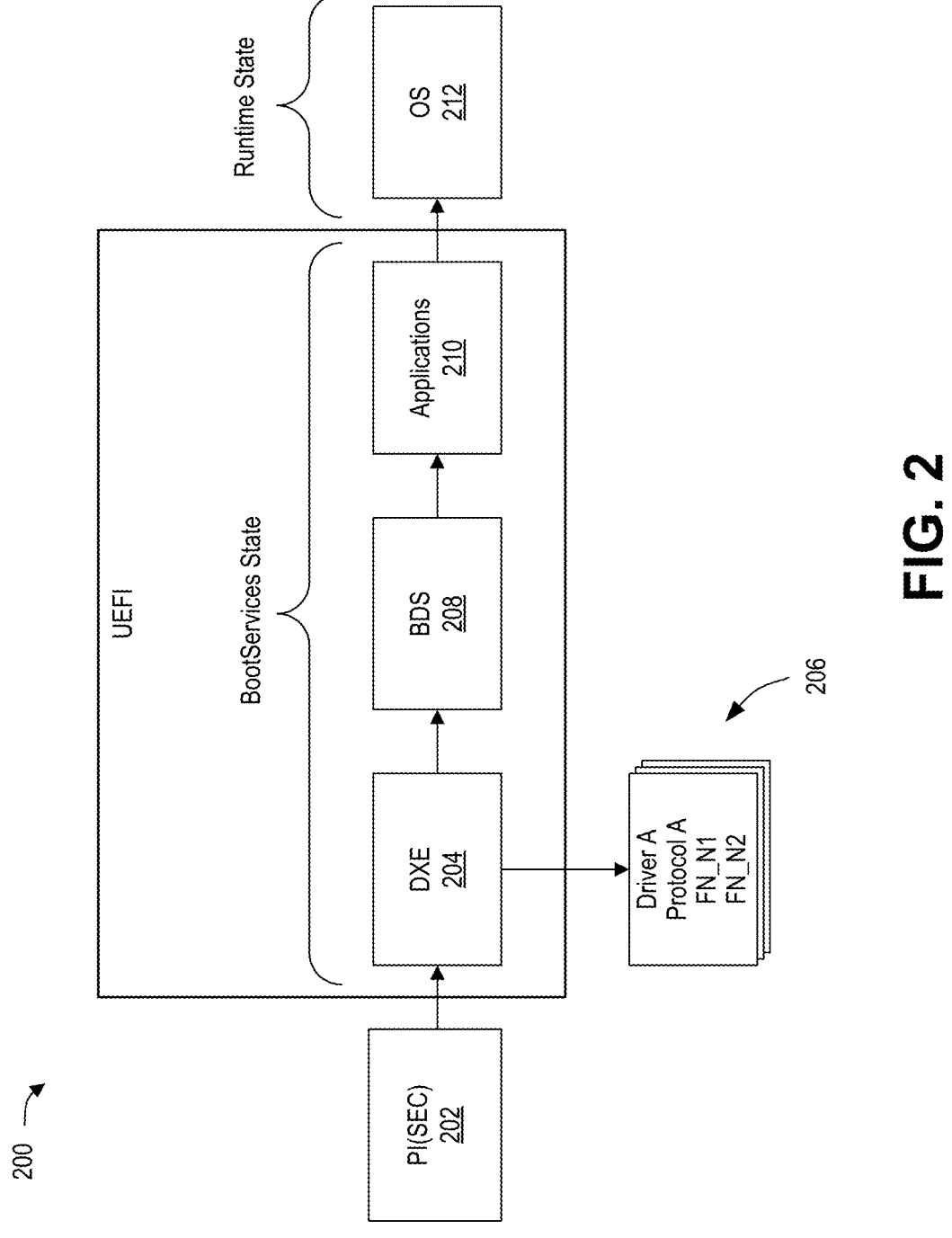
FIG. 2 illustrates a block diagram that illustrates example boot phases for an SoC.

FIG. 2 is a block diagram that illustrates example boot phases (e.g., stages) for an SoC in accordance with some aspects of the disclosure. FIG. 2 illustrates a chain of example boot phases defined in the UEFI specification and a PI specification that define a pre-boot environment. Each boot phase may correspond to a separate firmware image that is loaded and run on a CPU core (e.g., CPU core 111) of the SoC 100 to perform the functions of the boot phase. The firmware images may correspond to or be included in the BL3 firmware image. A first boot phase in the chain is shown as PI (e.g., SEC) 202, which is loaded first on SoC 100. PI 202 is configured to perform platform, target, and architecture dependent initialization.

The PI 202 is configured to provide the initialization information to the next boot phase in the DXE 204. In some aspects, the DXE 204 is configured to enable driver services in the pre-boot environment. For example, the DXE 204 includes a core image (e.g., DxeCoreImage) that provides independent capabilities irrespective of platform, compiler target, and architecture. The DXE 204 is configured to load one or more driver images 206, such as driver images from an external storage (not shown). Each driver corresponds to a driver service, which provides platform, compiler target, and architecture independent capabilities and services. The driver services can then be made available to any application that is launched and executed on computing cores of SoC in the pre-boot environment. For example, a file system driver may enable the UEFI to read the contents of a storage medium.

After the driver images 206 are loaded, the SoC continues to boot by loading and executing the BDS 208. During the execution of the BDS 208, all drivers are loaded and initialized at the SoC. Further, the complete pre-boot environment system and protocol services are functional. The BDS 208 is configured to process boot options based on persistent settings in environment variables. Further, BDS 208 may be configured to launch various applications 210, such as an OS loader application, any verification applications, etc., to continue booting the SoC. In one aspect, an application 210 may load and launch an OS 212 on the SoC. Though certain examples are shown with respect to a UEFI environment and UEFI applications, the techniques may similarly be applied to other suitable environments and applications.

One limitation of the UEFI specification, which is also a limitation of most conventional bootloaders or pre-boot environments such as Uboot, coreboot, etc., is that it is limited to using a single CPU core of an SoC executing a single thread on the single CPU core. For example, applications run in the pre-boot environment may be limited to using a single CPU core of the SoC and execute as a single thread, and boot of the SoC may only occur using a single CPU core of the SoC running a single thread. Booting with a single CPU core may slow boot time and impact the performance of processes in the pre-boot environment, such as authentication processes and factory programming processes for the SoC.

Figure 3:
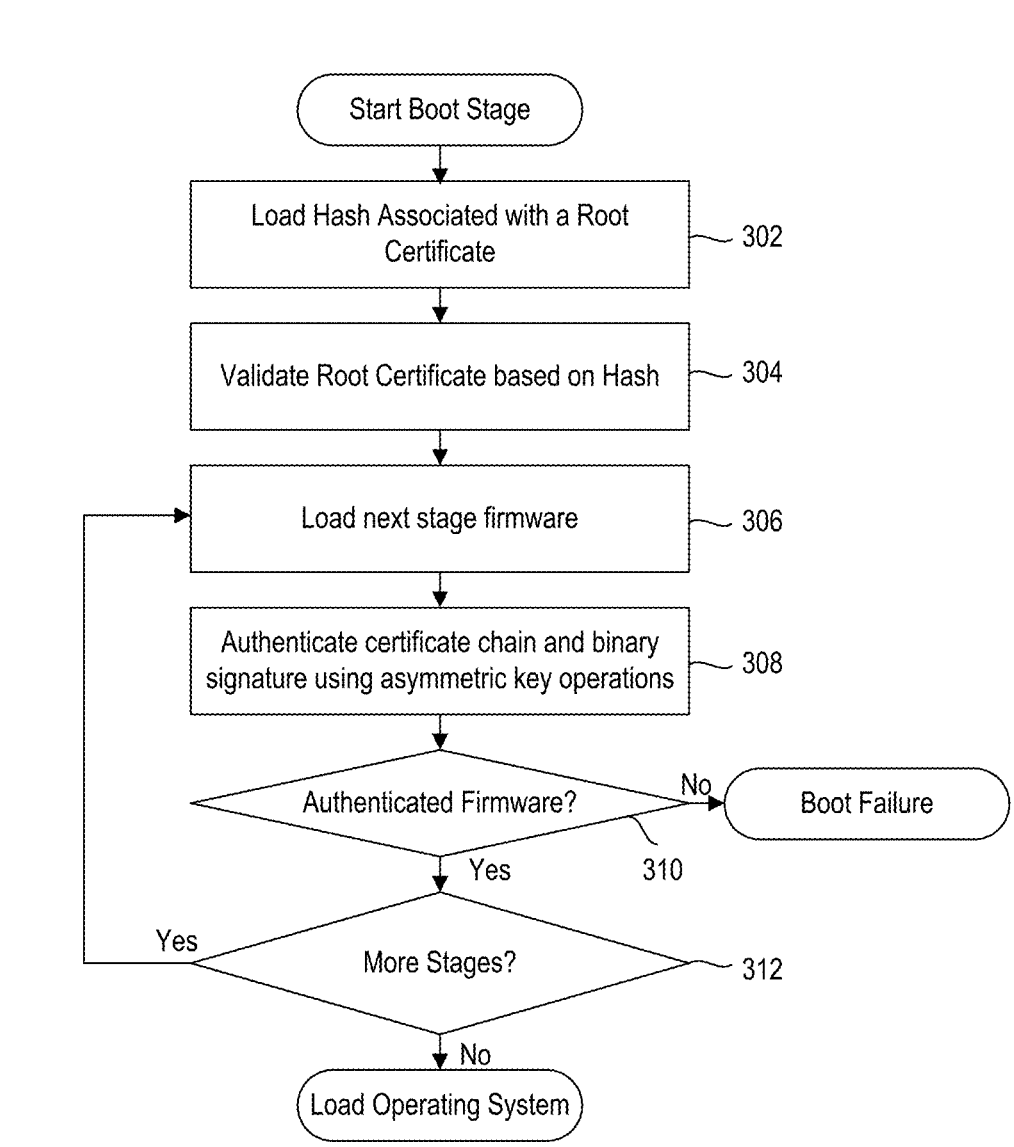
FIG. 3 illustrates a method of authenticating a plurality of boot software binaries that uses multiple asymmetric cryptographic operations to authenticate each firmware in accordance with some aspects of the disclosure.

FIG. 3 illustrates a method of booting an OS in an SoC based on convention asymmetric cryptographic operations. In some aspects, an SoC or a CPU of a device (e.g., a mobile phone, a laptop, an extended reality (XR) device such as a virtual reality (VR) device or augmented reality (AR) device, a vehicle or component or system of a vehicle, or other types of computing device) may perform the operations of FIG. 3.

At block 302, the SoC or CPU may load hash associated with a root certificate. The lash may be stored in non-volatile memory, such as a ROM or an e-fuse programmed into the SoC or CPU.

At block 304, the SoC or CPU may validate a root certificate based on the hash. In this case, the hash is static and cannot be changed to prevent tampering with the SoC or CPU. The SoC or CPU may load the root certificate, which can be stored in another non-volatile memory, and then authenticate that the root certificate is not altered based on a one-way hash, which should cause the result of the one-way hash to correspond to the hash loaded in block 302. Although not shown, if the result of the one-way hash does not correspond to the hash loaded in block 302, the boot fails.

In the event the hash does validate at block 304, at block 306, the SoC or CPU may load a next stage firmware (e.g., a device firmware) into a memory of the SoC or CPU. SoC and CPU device architecture may vary, and the firmware can be stored in a secure storage medium or an insecure storage medium.

At block 308, the SoC or CPU may authenticate a certificate chain and a binary signature of the firmware using asymmetric key operations. For example, at block 308, at least two asymmetric key operations can be performed. In particular, the firmware may also include an attestation certificate, a public key, and a signature. Validation of the firmware can comprise at least two authentications. For example, the SoC or CPU can validate that the root certificate has signed the attestation certificate using the public key. After validating the attestation certificate, the SoC or CPU may validate the firmware using the attestation certificate and the signature.

In the example described in block 308, at least two symmetric cryptographic operations are performed. In some examples, block 308 can include authentication of multiple firmware (or firmware images). For example, an original equipment manufacturer (OEM) can sign the firmware to prevent a third-party manufacturer from altering the firmware, which is then further signed by the third-party manufacturer.

At block 310, the SoC or CPU determines whether the firmware at block 308 has been authenticated. If the firmware does fail the authentication, the boot process fails. If the SoC determines that the software binary is authenticated at block 310, the SoC or CPU proceeds to block 312.

At block 312, the SoC or CPU determines if there are additional boot stages. In some cases, the SoC may include three stages of boot process, but the ultimate number of stages varies based on the device, the features that need to be supported during a boot operation, and so forth. In one example, a first stage initializes a memory and basic hardware components, a second stage initializes various drivers (e.g., a network interface), and a third stage initializes one or more protocols (e.g., to boot an external image to repair the device). The boot stages are provided as an example and do not limit the type of stages, the purposes of the different stages, and so forth. If it is determined that there are additional boot stages at block 312, the SoC or CPU returns to block 306 to load the next stage of the firmware. On the other hand, if there are no additional boot stages at block 312, the SoC or CPU proceeds to load an operating system, and the method 300 ends.

As noted above, asymmetric cryptographic operations are processor intensive and consume a small amount of time. In some cases, the number of firmware to be loaded may increase based on the number of embedded devices (e.g., network interfaces, DSPs, neural network processing units (NNPUs), network processing units (NPUs), hardware interfaces, etc.). In addition, as noted above, each driver performs at least two asymmetric cryptographic operations per software boot binary. These operations can consume a significant amount of time and may add a non-trivial amount of time to the boot operation, as well as increase the amount of power consumed during startup.

Figure 4:
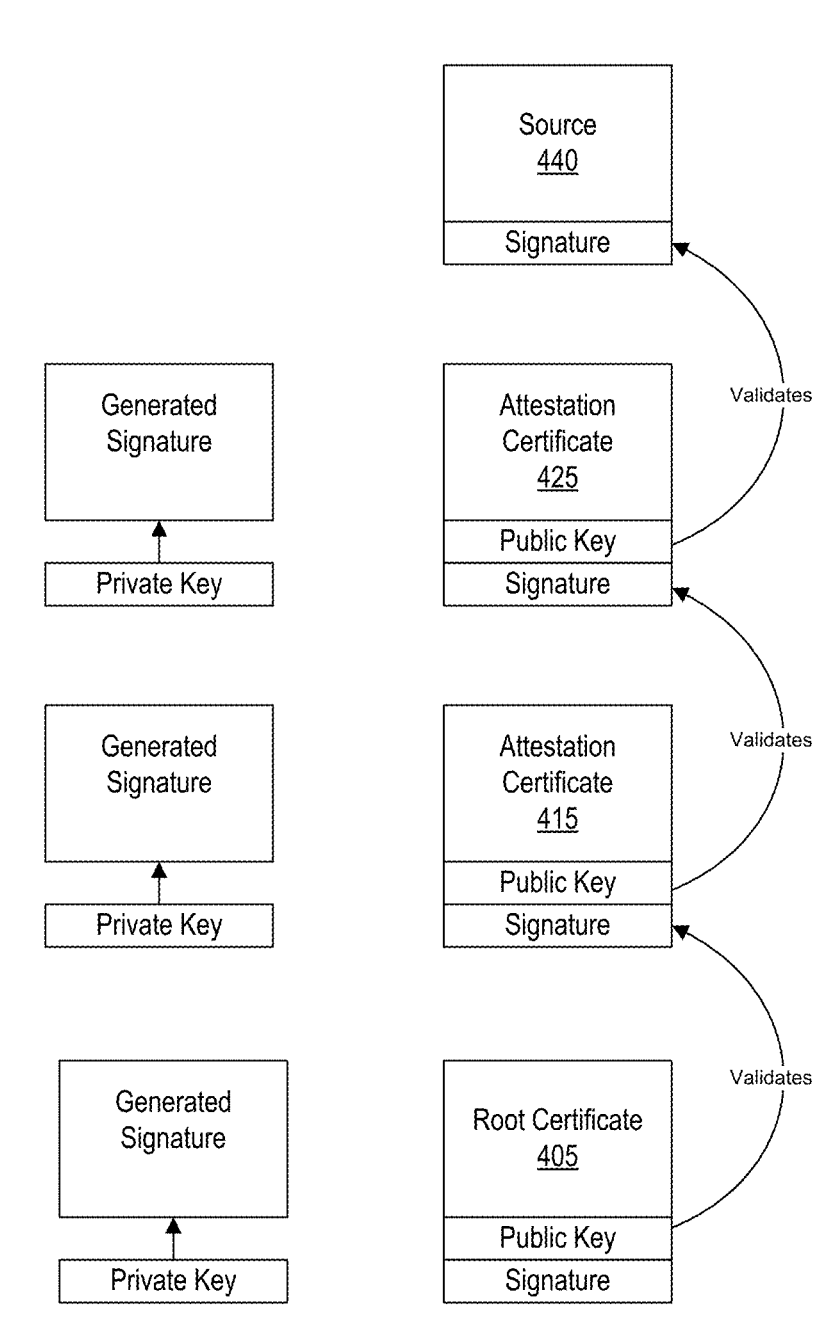
FIG. 4 is a conceptual diagram illustrating multiple asymmetric cryptographic operations in accordance with some aspects of the disclosure.

FIG. 4 is an example illustration 400 of a firmware loading sequence that uses asymmetric cryptography operations. In particular, FIG. 4 illustrates a root certificate 405, a first attestation certificate 415 signed by the root certificate 405, a second attestation certificate 425 signed by the first attestation certificate 415, and a firmware 440 signed by the second attestation certificate 425. The signature at each stage authenticates (or validates) a signature of a next stage, and a signature of each certificate is verified for each stage.

In this case, each certificate (e.g., the root certificate 405, the first attestation certificate 415, etc.) includes a signature that verifies the authenticity of a next stage. In this case, there are at least three authentications using asymmetric cryptography, which can incur a significant amount of time. For example, a loading a firmware can incur a 10 ms computation per asymmetric calculation, and loading three firmware images would incur 90 ms of delay. However, the device may have a large number of firmware to load, and the boot operation may incur a significant delay.

FIG. 5 is a block diagram of a multistage boot device 500 with independent stage keys in accordance with some aspects of the disclosure. In some aspects, the multistage boot device 500 includes a firmware access engine 510 that is configured to authenticate one or more firmware. In some cases, firmware may also be referred to as a boot software binary or a firmware image. As noted above, firmware is a software binary that is loaded into a device and executed by the device. In some cases, the firmware may also be a pure function that is configured to perform initialization or test functions. For example, an external memory (e.g., a DDR) may need to be initialized during the boot sequence. The firmware access engine 510 may include a root certificate verification engine 512 that is configured to authenticate a root certificate image that is stored within the device. In one aspect, the root certificate can be stored in a non-volatile memory such as a flash storage medium, and a hash associated with the root certificate can be stored in hardware, such as in a ROM or in an e-fuse of the device. In some cases, multiple root certificates and multiple corresponding hashes can be stored. For example, in the event a root certificate is compromised, a corresponding e-fuse can be blown to prevent the use of that root certificate. The firmware access engine 510 is configured to compute a hash of the root certificate at boot time and compare the computed hash to the hash stored in hardware to authenticate that the root certificate has not been modified. In general, the root certificate does not necessarily need to be stored in a secure location but should not be made available to prevent inadvertent damage to the system.

The firmware access engine 510 also includes an asymmetric verification engine 514 that is configured to perform conventional asymmetric authentication of a software boot binary, as described above. For example, the asymmetric verification engine 514 may be configured to authenticate firmware by authenticating an attestation signature and then validating a signature of the firmware using the attestation signature.

The firmware access engine 510 also includes a symmetric verification engine 516 that is configured to perform symmetric authentication based on a prior asymmetric authentication in accordance with some aspects of the disclosure. In some cases, a symmetric authentication can also include a hash function to validate the authenticity of a message. In some cases, an authentication tag may be generated by the symmetric verification engine 516 during asymmetric authentication of a software boot binary and may then be used by the symmetric verification engine 516 during subsequent boots to authenticate the firmware. In some aspects, the symmetric authentication requires a single authentication per firmware in each stage, as compared to the at least two asymmetric authentications in the asymmetric verification engine 514. In some aspects, the symmetric verification engine 516 can be configured to fall back to the asymmetric verification engine 514 in some cases. For example, when an over-the-air (OTA) update of a firmware occurs, a hash computed by the symmetric verification engine 516 will fail based on the firmware having changed and an asymmetric cryptographic operation is performed to validate the authenticity of the updated firmware.

The 500 also includes a storage medium 520 (e.g., the storage 195 of FIG. 1) that stores a plurality of firmware 522 and authentication tags 524. The authentication tags 524 are symmetric encrypted values or hashed values and each authentication tag corresponds to a single firmware 522. For example, each authentication tag 524 may be a cryptographic hash that uniquely identifies the firmware 522 based on the corresponding cryptographic hashing function. In some aspects, a keyed cryptographic hashing function may be used to create the hashes of each firmware 522. In some aspects, the boot process can consist of several stages, such as loading a first set of firmware to access system components (e.g., external memory, flash memory, etc.) followed by a second stage (e.g., network drivers, etc.). For example, the first set of firmware may initialize DDR memory to allow later boot to external memory because the firmware of later stages may be too large for internal SRAM in the SoC or CPU.

In some aspects, the authentication tag 524 may be a key-pair value that maps a firmware 522 to a value. The key can be, for example, an address or other metadata that uniquely identifies a firmware 522 that corresponds to the value. In this case, the value is a hash value that is calculated by the asymmetric verification engine 514 during a boot operation. As noted above, a firmware 522 may be updated using OTA techniques, and on a next boot, the hashed value stored in the authentication tag 524 will not match due to the firmware 522 having different content. Tables 1-3 below illustrate example tables of authentication tags 524 corresponding to different firmware boot stages for the device. The firmware listed in Tables 1-3 is not limiting and is provided to illustrate different potential firmware that can be implemented by the SoC or CPU.

TABLE 1

| Boot Stage 1 Firmware | |
| --- | --- |
| Firmware Name | Keyed Hash |
| DDR Initialization | 6okA6zdhZMMoEdQgl3HA |
| Flash memory initialization | 3ZrE8uk2IbWfFRqpg31T |
| Power control processor | 4WWtpzuexUCG6ykmHbC0 |
| Security processor | 5D8AyQlfzttKTy2RJVhQ |
| Random Number Generator | zubybB4SJWgDQdXKvQb0 |

TABLE 2

| Boot Stage 1 Firmware | |
| --- | --- |
| Firmware Name | Keyed Hash |
| Image signal processor | IYGkLlshhSbmxLhHvGFT |
| Network communication module | 1i8poRM5opkeH0QxI73L |
| DSP | VFyxTkCwv2g6k0rbKfdP |
| PCIe | x49xrlbWkskkzhbG5KDP |
| USB | WnE5oLvV9UhYeYP5sZEC |

TABLE 3

| Boot Stage 3 Firmware | |
| --- | --- |
| Firmware Name | Keyed Hash |
| Motion coprocessor | YhfCMeqqX2sFo9ot7nhp |
| UWB module | Zeok2dcOzGCCainRGA9z |
| NFC module | tX0QFuKlTZ5ylOwZbGAT |
| Motion sensors | tMMfSD6zIjoDPEht8nvt |
| Video decoder | D5wqZCzAELgLR7H8nqrn |

Although the authentication tags 524 are described as keyed hashes, the authentication tags 524 may also be ciphertext that can be decoded using a private key. In one aspect, the private key can decode a serial number or some other identifying information, such as a checksum, to verify the authenticity of the firmware or device. In some aspects, the authentication tag 524 may be keyed to detect tampering with the authentication tags. In the case that the authentication tags 524 are keyed hashes, the authentication tags 524 can be stored in a non-restricted storage medium, such as in a flash memory that is not secured using, for example, a secure enclave. In other cases, the authentication tags 524 can further include additional information, such as an encryption type, a hashing type, or other identifying information that can distinguish different types of encryption or hashing.

FIG. 6 illustrates a method 600 of a firmware authentication engine for authenticating a plurality of boot software binaries with independent stage keys in accordance with some aspects of the disclosure. The method 600 may implement the firmware access engine 510 of FIG. 5 and is executed by a computing device (e.g., a CPU core 111 of an SoC or a computing system 900 of FIG. 9). In one aspect, the method 600 corresponds to operations associated with the asymmetric verification engine 514 and the symmetric verification engine 516 and is presumed to begin after loading and authenticating an initial boot sequence associated with the boot ROM.

At block 602, the computing system may load a next stage of firmware (e.g., from the plurality of firmware 522 in FIG. 5) and authentication tags (e.g., the authentication tags 524). The firmware may be loaded into SRAM of the CPU (e.g., SRAM 152) or into an external memory (e.g., a DDR memory) based on the availability of the external memory (e.g. if the DDR memory has been initialized).

At block 604, the computing system may generate a stage-specific key based on a device private key and a boot value. The private key may be made unavailable to system resources and, for example, may be programmed into an e-fuse or a restricted ROM, and the boot value is a value that is associated with a boot stage. In some cases, the boot value may be a rotating value that is determined based on a hardware resource, such as a random number generator, or other method.

At block 606, the computing system calculate a hash value of the loaded firmware based on the authentication tags and the stage-specific key. Although a hash is calculated, other types of values can be generated. For example, the ciphertext can be decoded using the stage-specific key. For purpose of clarity in this non-limiting aspect, the following description presumes the use of hashing function At block 608, the computing system determines whether the authentication tags are authenticated. For example, if the computing system determines the hash value calculated at block 608 corresponds to the authentication tag associated with the corresponding firmware (e.g., the keyed hash values illustrated in Tables 1-3 above), the firmware is authenticated and the method 600 proceeds to block 610. In some aspects, block 608 may include the authentication of multiple firmware images. For example, as noted above in Tables 1-3, boot stages 1-3 each include multiple firmware images, and each firmware image must be authenticated to proceed to block 610. If the calculated hash value fails to correspond to the authentication tag associated with the corresponding firmware, the firmware is not authenticated, and the method 600 proceeds to block 612.

At block 612, the computing system falls back to a conventional authentication using asymmetric cryptography, as described above. For example, the computing system can validate that the certificate associated with the firmware is authentic, and then verify that the signature of the firmware is authentic using a public key. Although not shown, failure to authenticate the firmware indicates that the firmware is compromised and boot fails. For purposes of clarity, the firmware is presumed to authenticate at block 612.

At block 614, the computing system may generate authentication tags of the firmware that failed authentication at block 608 using the stage-specific key. For example, the computing system may generate a hash based on the firmware based and the stage-specific key.

At block 616, the computing system may update the authentication tags for the firmware. For example, presuming that the USB firmware identified in Table 2 is updating in an OTA upgrade, the USB firmware will fail the authentication tag-based authentication at block 608 due to an OTA update. However, the USB firmware is signed with an attestation certificate (e.g., during the OTA update) and is authenticated at block 612. The computing system updates the keyed hash in Table 3 above based on the new authentication tag generated for the updated firmware at block 616. After updating the authentication tags, the method 600 proceeds to block 618.

At block 610, the computing system determines that the boot stage is complete and updates the boot value to correspond to a next stage. In some aspects, block 610 can occur at the beginning of a stage or an end of a stage. For example, block 610 may occur after loading the firmware images at block 602. In this case, the boot value ensures firmware are loaded at a corresponding stage and in a proper sequence. For example, an image signal processor (ISP) firmware may have a size that exceeds an SRAM of a CPU core (e.g., CPU core 111), and the external DDR memory should be initialized to enable the CPU to store the ISP firmware to the DDR memory.

The computing system may also provide the firmware to corresponding devices for initializing the various devices of the SoC or CPU. As noted above, a firmware is executed by the device for low-level control, such as for controlling hardware components within the device.

At block 618, the computing system determines if there are more boot stages. If more boot stages exist, the method 600 returns to block 602 to load firmware associated with the next stage. If no more boot stages exist, the computing system then proceeds to operations related to loading an OS to enable user interaction with the device.

Figure 7:
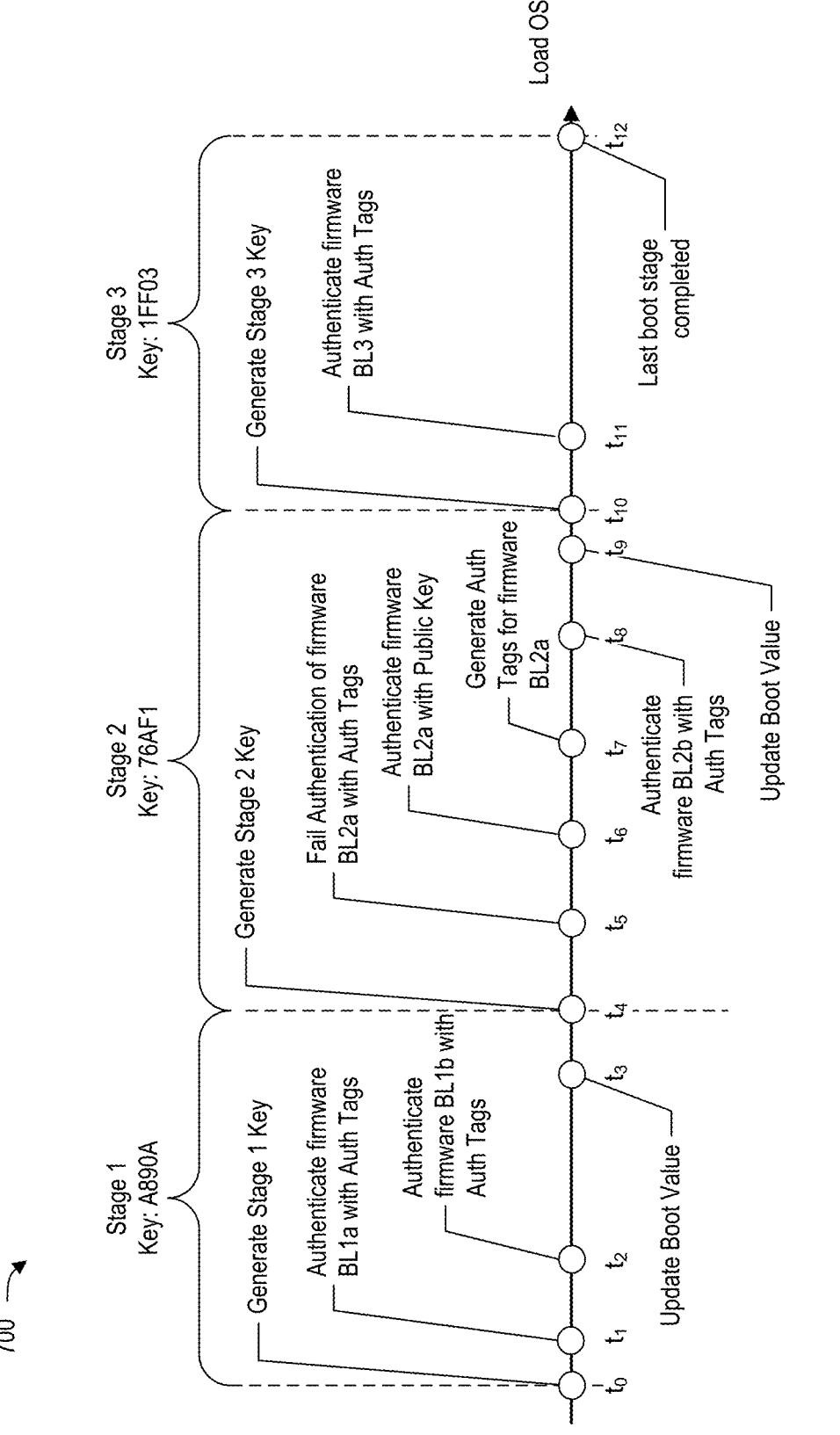
FIG. 7 illustrates a timeline associated with an example boot operation of a multistage boot with independent stage keys in accordance with some aspects of the disclosure.

FIG. 7 illustrates a timeline 700 associated with an example boot operation of a multistage boot with independent stage keys in accordance with some aspects of the disclosure. In some aspects, the timeline 700 is not drawn to scale and is provided to further describe the operation of the firmware access engine 510. In some aspects, prior to the timeline 700, a computing system (e.g., a CPU core 111 of an SoC or a computing system 900 of FIG. 9) loads, authenticates and executes an initial boot ROM. In some aspects, the boot ROM includes instructions to execute the method 600 of FIG. 7 and perform the operations described in the timeline.

In one aspect, at time to, the computing system generates a stage 1 key associated with the firmware of this stage. As an example, the stage 1 key may be "A890A" and a keyed hash for validating authentication keys or a private key for decrypting the authentication tags. In one example, a boot value of the computing system and a device private key are combined using, for example, a key derivation function to generate the stage 1 key. As noted above, the stage 1 key is associated with a hashing function or an encrypting function associated with the firmware of stage 1.

At time $t_1$, the computing system authenticates firmware BL1$a$ with an authentication tag. For example, the stage 1 key can be a key for generating a keyed hash, and a resulting keyed hash value corresponds to the value of the authentication tag (e.g., as shown in Tables 1-3) if the firmware is authentic. As described above, the keyed hash of the firmware is generated after authenticating the firmware with the slower and more processor intensive asymmetric authentication techniques.

At time $t_2$, the computing system authenticates firmware BL2$a$ with an authentication tag. In this case, the stage 1 boot includes two different firmware, but the stage can include additional or fewer firmware images to authenticate.

At time $t_3$, the computing system determines that all boot state 1 firmware is authentic, proceeds to load the firmware into each corresponding device or perform a corresponding function, and then updates a boot value to correspond to stage 2. For example, as noted above, stage 1 can include a DDR firmware that includes instructions executed by the CPU core to initialize the memory. The generation of the boot value to correspond to stage 2 can be any suitable function to generate a suitable key that is combined with the device key. For example, the boot value can be a rotating key that is generated based on an encryption algorithm using, for example, system time.

In stage 1, the loading time is decreased because the symmetric cryptographic operations are faster than asymmetric cryptographic operations. As an example, a private key for symmetric encryption is recommended to have a length of 128 bits, and an asymmetric key is recommended to have 2048 bits. A private key would require fewer computations alone by virtual of the key length, but asymmetric computations are also more complex.

At time $t_4$, the computing system is deemed to enter stage 2 and the stage 2 key is generated based on the updated boot value (at time $t_3$) and the private device key. For example, as shown in FIG. 7, the stage 2 key is "76AF1" for purposes of illustration.

At time $t_5$, the computing system loads firmware BL2$a$ from storage (e.g., a ROM, a flash memory, etc.) and authentication with the authentication tags fails. For example, as noted above, BL2$a$ may have been updated due to an OTA firmware update.

At time $t_6$, the computing system authenticates firmware BL2$a$ with a public key, as well as the authentication of the attestation certificate that signed the firmware BL2$a$.

At time $t_7$, the computing system generates an authentication tag for firmware BL2$a$. For example, using the stage 2 key generated at time $t_4$, the computing system generates a keyed hash and then stores the keyed hash in the authentication tags. For example, the computing system can update a value associated with the corresponding firmware using a table, such as illustrated above in Tables 1-3.

At time $t_8$, the computing system authenticates firmware BL2$b$ using its corresponding authentication tag. In this case, the firmware BL2$b$ is deemed authentic based on the symmetric cryptographic operations.

At time $t_9$, the computing system determines that all boot state 2 firmware is authentic, proceeds to load the firmware into each corresponding device or perform a corresponding function, and then updates a boot value to correspond to stage 3.

At time $t_{10}$, the computing system is deemed to enter stage 3, and the stage 3 key is generated based on the updated boot value (at time $t_9$) and the private device key. For example, as shown in FIG. 7, the stage 3 key is "1FF03" for purposes of illustration.

At time $t_{11}$, the computing system authenticates firmware BL3 with a corresponding authentication tag (e.g., from Table 3). After the authentication of all firmware in stage 3, the computing system determines that the firmware of boot state 3 is authentic and proceeds to load the firmware into each corresponding device or perform a corresponding function.

At time $t_{12}$, the computing system has loaded all firmware and proceeds to load an OS.

FIG. 8 is a flow diagram illustrating a process 800 for booting a device using multiple stages with independent stage keys in accordance with some aspects of the disclosure. The process 800 can be performed by a computing device or a component or system of the computing device (e.g., an SoC of FIG. 1 or a computing system 900 of FIG. 9.). In some cases, the computing device may be integral to a mobile device (e.g., a mobile phone), a network-connected wearable such as a watch, an extended reality (XR) device such as a virtual reality (VR) device or augmented reality (AR) device, a vehicle or component or system of a vehicle, or other types of computing devices. The operations of the process 800 may be implemented as software components that are executed and run on one or more processors (e.g., one or more of the CPUs of FIG. 1, processor 910 of FIG. 9, and/or other processor(s)).

In some aspects, the computing device (or component thereof) may load an initial boot stage from a boot read only memory and authenticate the initial boot stage using a public key associated with the initial boot stage. In this case, the first stage key is generated based on authenticating the initial boot stage. For example, if the initial boot stage does not authenticate, the boot fails.

At block 802, the computing device (or component thereof) may generate a first stage key for a first stage of a current boot operation of the device based on a private key associated with the device.

In one aspect, as part of block 802, the computing device (or component thereof) may compute, using symmetric encryption, a first value associated with the first firmware based on the first stage key. The symmetric encryption can be the computing of a ciphertext, decoding of a ciphertext, or computing a hash. A value determined based on the symmetric encryption is compared to the first authentication tag to authenticate the first firmware. For example, a computed hash can authenticate the validity of the first firmware. In other examples, the decoded text from the ciphertext can authenticate the validity of the first firmware.

At block 804, the computing device (or component thereof) may authenticate a first firmware of the first stage using a first authentication tag and the first stage key, wherein the first authentication tag is generated during a previous boot operation. The first authentication tag may be generated based on a symmetric encryption using the private key and a boot value corresponding to a boot stage of the current boot operation.

In some aspects, as part of block 804, the first authentication tag may not be available (e.g., the first authentication tag was deleted during an OTA update). In this case, the computing device (or component thereof) may authenticate the first firmware using a public key based on the first authentication tag being unavailable and generate the first authentication tag of the first firmware based on authenticating the first firmware using the public key.

In some cases, as part of block 804, the first firmware was updated by the device during a previous power cycle of the device and, accordingly, failed to authenticate based on the firmware being different. In this case, the computing device (or component thereof) may authenticate the first firmware using a public key based on identifying the first firmware does not correspond to the first authentication tag and generate an updated authentication tag for the first firmware based on authenticating the first firmware using the public key.

In some aspects, as part of block 804, the computing device (or component thereof) may authenticate the first authentication tag based on a message authentication code. In this case, in response to a failure to authenticate the first authentication tag, the computing device (or component thereof) may authenticate the first firmware using a public key and generate an updated authentication tag for the first firmware based on authenticating the first firmware.

In some cases, the first authentication tag and the first firmware are stored in a single storage medium. For example, the first firmware and the first authentication tag may be stored in an unsecured storage medium, such as a flash memory. Because the authentication tags are keys or keyed hashes, tampering with the firmware or the authentication tag will be identified. In other cases, the authentication tags and the firmware can be stored in different locations. For example, the first authentication tag is stored in a restricted storage medium.

At block 806, the computing device (or component thereof) may execute the first firmware based on authenticating the first firmware. In one illustrative aspect, as part of block 806, the executing of the first firmware may include loading the first firmware into a corresponding device and then executing the first firmware at the device. In another aspect, as part of block 806, the executing of the first firmware may be a function to initialize a component of the computing device (or component thereof). For example, the function may be an initialization function to initialize a DDR memory or a flash drive. In some aspects, the function may be a test to ensure the component is functioning.

In some cases, after executing the first firmware, the computing device may update the boot value to correspond to a second stage based on validating each firmware associated with the first stage. After updating the boot value, the computing may generate a second stage key for the second stage of the current boot operation based on the private key and the hoot value, and may then authenticate a second firmware using a second authentication tag and the second stage key. After authenticating the second firmware, the computing device (or component thereof) may execute the second firmware, which is associated with a second device. For example, the second firmware may be loaded into a memory of the second device and executed. However, the second firmware may be executed from the CPU core to initialize, test, or perform another function associated with the second device.

In some aspects, the boot stage may include multiple firmware to be loaded and authentication. In this case, the computing device (or component thereof) may authenticate a second firmware of the first stage using a second authentication tag and the first stage key and execute the second firmware based on authenticating the second firmware.

Figure 9:
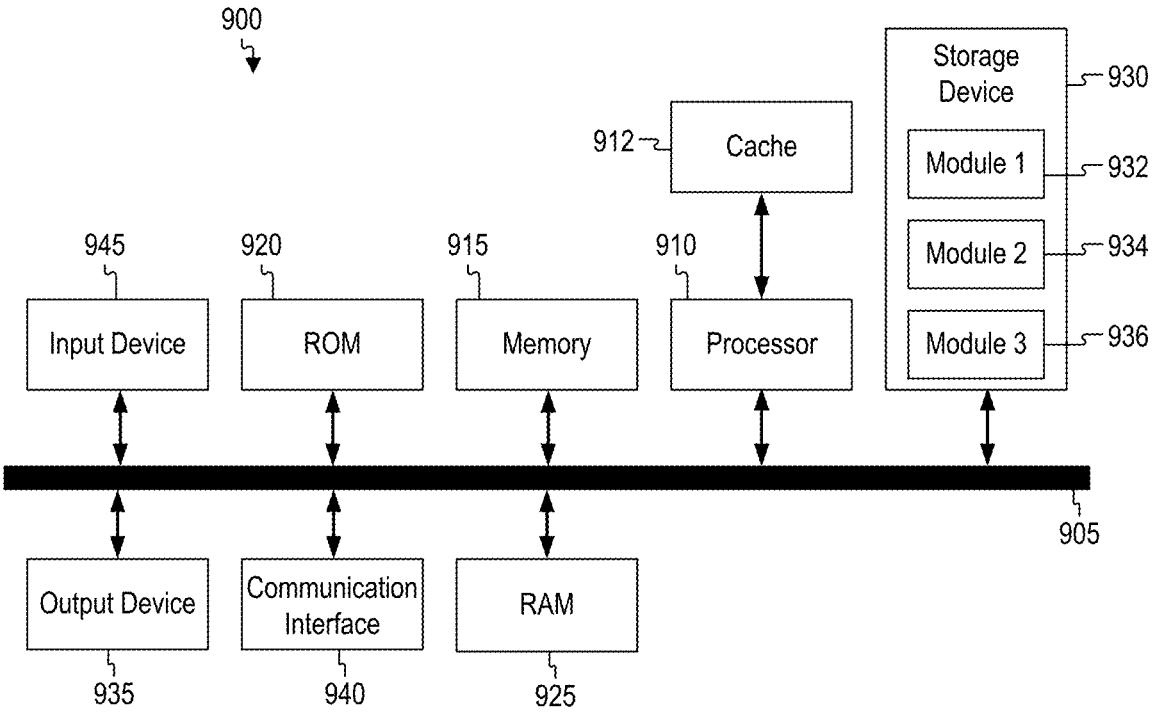
FIG. 9 shows an example of a computing system, which may be for example any computing device that may implement components of the system.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

The example computing system 900 includes at least one processing unit (CPU or processor) 910 and connection 905 that communicatively couples various system components including system memory 915, such as ROM 920 and RAM 925 to processor 910. Computing system 900 may include a cache 912 of high-speed memory connected directly with, in close proximity to, or integrated as part of processor 910.

Processor 910 may include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communication interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a USB port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System, and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), SRAM, DRAM, read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. A method for booting a device, the method comprising: generating a first stage key for a first stage of a current boot operation of the device based on a private key associated with the device; authenticating a first firmware of the first stage using a first authentication tag and the first stage key, wherein the first authentication tag is generated during a previous boot operation; and executing the first firmware based on authenticating the first firmware.

Aspect 2. The method of Aspect 1, wherein authenticating the first firmware comprises: computing, using symmetric encryption, a first value associated with the first firmware based on the first stage key; and comparing the first firmware to the first authentication tag to authenticate the first firmware.

Aspect 3. The method of any of Aspects 1 to 2, wherein the first authentication tag is generated based on a symmetric encryption using the private key and a boot value corresponding to a boot stage of the current boot operation.

Aspect 4. The method of Aspect 3, further comprising: updating the boot value to correspond to a second stage based on validating each firmware associated with the first stage.

Aspect 5. The method of Aspect 4, further comprising: after updating the boot value, generating a second stage key for the second stage of the current boot operation based on the private key and the boot value; authenticating a second firmware using a second authentication tag and the second stage key; and executing the second firmware based on authenticating the second firmware.

Aspect 6. The method of any of Aspects 1 to 5, further comprising: authenticating the first firmware using a public key based on the first authentication tag being unavailable; and generating the first authentication tag of the first firmware based on authenticating the first firmware using the public key.

Aspect 7. The method of any of Aspects 1 to 6, further comprising: authenticating the first firmware using a public key based on identifying the first firmware does not correspond to the first authentication tag; and generating an updated authentication tag for the first firmware based on authenticating the first firmware using the public key.

Aspect 8. The method of Aspect 7, wherein the first firmware was updated by the device during a previous power cycle of the device.

Aspect 9. The method of any of Aspects 1 to 8, further comprising: loading an initial boot stage from a boot read only memory; and authenticating the initial boot stage using a public key associated with the initial boot stage, wherein the first stage key is generated based on authenticating of the initial boot stage.

Aspect 10. The method of any of Aspects 1 to 9, further comprising: authenticating the first authentication tag based on a message authentication code; in response to failure to authenticate the first authentication tag, authenticating the first firmware using a public key; and generating an updated authentication tag for the first firmware based on authenticating the first firmware.

Aspect 11. The method of Aspect 10, wherein the first authentication tag and the first firmware are stored in a single storage medium.

Aspect 12. The method of any of Aspects 1 to 11, wherein the first authentication tag is stored in a restricted storage medium.

Aspect 13. The method of any of Aspects 1 to 12, further comprising: authenticating a second firmware of the first stage using a second authentication tag and the first stage key; and executing the second firmware based on authenticating the second firmware.

Aspect 14. An apparatus for performing a boot operation, the apparatus including at least one memory and at least one processor coupled to the memory and configured to: generate a first stage key for a first stage of a current boot operation of the device based on a private key associated with the device; authenticate a first firmware of the first stage using a first authentication tag and the first stage key, wherein the first authentication tag is generated during a previous boot operation; and execute the first firmware based on authenticating the first firmware.

Aspect 15. The apparatus of Aspect 14, wherein the at least one processor is configured to: compute, using symmetric encryption, a first value associated with the first firmware based on the first stage key; and compare the first firmware to the first authentication tag to authenticate the first firmware.

Aspect 16. The apparatus of any of Aspects 14 to 15, wherein the first authentication tag is generated based on a symmetric encryption using the private key and a boot value corresponding to a boot stage of the current boot operation.

Aspect 17. The apparatus of Aspect 16, wherein the at least one processor is configured to: update the boot value to correspond to a second stage based on validating each firmware associated with the first stage.

Aspect 18. The apparatus of Aspect 17, wherein the at least one processor is configured to: after updating the boot value, generate a second stage key for the second stage of the current boot operation based on the private key and the boot value; authenticate a second firmware using a second authentication tag and the second stage key; and execute the second firmware based on authenticating the second firmware.

Aspect 19. The apparatus of any of Aspects 14 to 18, wherein the at least one processor is configured to: authenticate the first firmware using a public key based on the first authentication tag being unavailable; and generate the first authentication tag of the first firmware based on authenticating the first firmware using the public key.

Aspect 20. The apparatus of any of Aspects 14 to 19, wherein the at least one processor is configured to: authenticate the first firmware using a public key based on identifying the first firmware does not correspond to the first authentication tag; and generate an updated authentication tag for the first firmware based on authenticating the first firmware using the public key.

Aspect 21. The apparatus of Aspect 20, wherein the first firmware was updated by the device during a previous power cycle of the device.

Aspect 22. The apparatus of any of Aspects 14 to 21, wherein the at least one processor is configured to: load an initial boot stage from a boot read only memory; and authenticate the initial boot stage using a public key associated with the initial boot stage, wherein the first stage key is generated based on authenticating of the initial boot stage.

Aspect 23. The apparatus of any of Aspects 14 to 22, wherein the at least one processor is configured to: authenticate the first authentication tag based on a message authentication code; in response to failure to authenticate the first authentication tag, authenticate the first firmware using a public key; and generate an updated authentication tag for the first firmware based on authenticating the first firmware.

Aspect 24. The apparatus of Aspect 23, wherein the first authentication tag and the first firmware are stored in a single storage medium.

Aspect 25. The apparatus of any of Aspects 14 to 24, wherein the first authentication tag is stored in a restricted storage medium.

Aspect 26. The apparatus of any of Aspects 14 to 25, wherein the at least one processor is configured to: authenticate a second firmware of the first stage using a second authentication tag and the first stage key; and execute the second firmware based on authenticating the second firmware.

Aspect 27. A non-transitory computer-readable storage medium comprising instructions stored thereon which, when executed by at least one processor, causes the at least one processor to perform operations according to any of Aspects 1 to 13.

Aspect 28. An apparatus for booting a device comprising one or more means for performing operations according to any of Aspects 1 to 13.

What is claimed is:

1. A method for booting a device, the method comprising:
generating a first stage key for a first stage of a current boot operation of the device based on a private key associated with the device;
authenticating a first firmware of the first stage using a first authentication tag and the first stage key, wherein the first authentication tag is generated during a previous boot operation and the first authentication tag is stored in a restricted storage medium; and
executing the first firmware based on authenticating the first firmware.

2. The method of claim 1, wherein authenticating the first firmware comprises:
computing, using symmetric encryption, a first value associated with the first firmware based on the first stage key; and
comparing the first firmware to the first authentication tag to authenticate the first firmware.

3. The method of claim 1, wherein the first authentication tag is generated based on a symmetric encryption using the private key and a boot value corresponding to a boot stage of the current boot operation.

4. The method of claim 3, further comprising:
updating the boot value to correspond to a second stage based on validating each firmware associated with the first stage.

5. The method of claim 4, further comprising:
after updating the boot value, generating a second stage key for the second stage of the current boot operation based on the private key and the boot value;
authenticating a second firmware using a second authentication tag and the second stage key; and
executing the second firmware based on authenticating the second firmware.

6. The method of claim 1, further comprising:
authenticating the first firmware using a public key based on the first authentication tag being unavailable; and
generating the first authentication tag of the first firmware based on authenticating the first firmware using the public key.

7. The method of claim 1, further comprising:
authenticating the first firmware using a public key based on identifying the first firmware does not correspond to the first authentication tag; and
generating an updated authentication tag for the first firmware based on authenticating the first firmware using the public key.

8. The method of claim 7, wherein the first firmware was updated by the device during a previous power cycle of the device.

9. The method of claim 1, further comprising:
loading an initial boot stage from a boot read only memory; and
authenticating the initial boot stage using a public key associated with the initial boot stage, wherein the first stage key is generated based on authenticating of the initial boot stage.

10. The method of claim 1, further comprising:
authenticating the first authentication tag based on a message authentication code;
in response to failure to authenticate the first authentication tag, authenticating the first firmware using a public key; and
generating an updated authentication tag for the first firmware based on authenticating the first firmware.

11. The method of claim 10, wherein the first authentication tag and the first firmware are stored in a single storage medium.

12. The method of claim 1, further comprising:
authenticating a second firmware of the first stage using a second authentication tag and the first stage key; and
executing the second firmware based on authenticating the second firmware.

13. An apparatus configured for multi-stage boot, comprising:
at least one memory; and
at least one processor coupled to the at least one memory and configured to:
generate a first stage key for a first stage of a current boot operation of the apparatus based on a private key associated with the apparatus;
authenticate a first firmware of the first stage using a first authentication tag and the first stage key, wherein the first authentication tag is generated during a previous boot operation and the first authentication tag is stored in a restricted storage medium; and
execute the first firmware based on authenticating the first firmware.

14. The apparatus of claim 13, wherein the at least one processor is configured to:

compute, use symmetric encryption, a first value associated with the first firmware based on the first stage key; and compare the first firmware to the first authentication tag to authenticate the first firmware.

15. The apparatus of claim 13, wherein the first authentication tag is generated based on a symmetric encryption using the private key and a boot value corresponding to a boot stage of the current boot operation.

16. The apparatus of claim 15, wherein the at least one processor is configured to:

update the boot value to correspond to a second stage based on validating each firmware associated with the first stage.

17. The apparatus of claim 16, wherein the at least one processor is configured to:

after updating the boot value, generate a second stage key for the second stage of the current boot operation based on the private key and the boot value;

authenticate a second firmware using a second authentication tag and the second stage key; and execute the second firmware based on authenticating the second firmware.

18. The apparatus of claim 13, wherein the at least one processor is configured to:

authenticate the first firmware using a public key based on the first authentication tag being unavailable; and generate the first authentication tag of the first firmware based on authenticating the first firmware using the public key.

19. The apparatus of claim 13, wherein the at least one processor is configured to:

authenticate the first firmware using a public key based on identifying the first firmware does not correspond to the first authentication tag; and generate an updated authentication tag for the first firmware based on authenticating the first firmware using the public key.

20. The apparatus of claim 19, wherein the first firmware was updated by the apparatus during a previous power cycle of the apparatus.

21. The apparatus of claim 13, wherein the at least one processor is configured to:

load an initial boot stage from a boot read only memory; and authenticate the initial boot stage using a public key associated with the initial boot stage, wherein the first stage key is generated based on authenticating of the initial boot stage.

22. The apparatus of claim 13, wherein the at least one processor is configured to:

authenticate the first authentication tag based on a message authentication code;

in response to failure to authenticate the first authentication tag, authenticate the first firmware using a public key; and generate an updated authentication tag for the first firmware based on authenticating the first firmware.

23. The apparatus of claim 22, wherein the first authentication tag and the first firmware are stored in a single storage medium.

24. The apparatus of claim 13, wherein the at least one processor is configured to:

authenticate a second firmware of the first stage using a second authentication tag and the first stage key; and execute the second firmware based on authenticating the second firmware.

* * * * *